United States Patent [19]

Spencer

[11] Patent Number: 4,998,378
[45] Date of Patent: Mar. 12, 1991

[54] BOOK-TYPE CONTAINER FOR RAISING SEEDLINGS

[76] Inventor: Henry A. Spencer, 8005 - 137 Street, Edmonton, Alberta, Canada, T5R 0C1

[21] Appl. No.: 562,533

[22] Filed: Aug. 3, 1990

[30] Foreign Application Priority Data

Aug. 5, 1989 [GB] United Kingdom ............... 8917976

[51] Int. Cl.⁵ ............................................... A01G 9/02
[52] U.S. Cl. .......................................... 47/77; 47/86; 206/423
[58] Field of Search ................... 47/77, 73, 84, 85, 86, 47/87; 206/423; 229/2.5

[56] References Cited

U.S. PATENT DOCUMENTS

| | | | |
|---|---|---|---|
| 3,986,299 | 10/1976 | Merzweiler | 47/73 |
| 3,992,810 | 11/1976 | Kimball | 47/87 X |
| 4,006,558 | 2/1977 | Neddo | 47/86 X |
| 4,057,932 | 11/1977 | Spencer | 47/85 X |

FOREIGN PATENT DOCUMENTS 8803752  6/1988  PCT Int'l Appl. ................... 47/86

Primary Examiner—David A. Scherbel
Assistant Examiner—Jerrold D. Johnson
Attorney, Agent, or Firm—Millen, White & Zelano

[57] ABSTRACT

The book-type seedling container is provided with shiplap seals extending the full length of the cavity-forming shoulders, without crossover of the shiplap ledges. This shiplap structure is combined with prong-and-socket means pinning the shoulders together at their outer ends. The seal resulting from this combination gives improved resistance to penetration of seedling roots from one cell to another.

2 Claims, 2 Drawing Sheets

BOOK-TYPE CONTAINER FOR RAISING SEEDLINGS

FIELD OF THE INVENTION

This invention relates to an improved book-type container for seedlings. More particularly, the container incorporates a shiplap joint and prong and socket pinning to ensure sealing of the container cells.

BACKGROUND OF THE INVENTION

This invention is an improvement of a known book-type container for raising seedlings. The container is disclosed in Canadian patents 989,614 and 1,068,482 issued to the present applicant.

In general, the container referred to comprises opposed front and rear wall members hinged together along their base. The wall members can be pivoted about their lower hinge from a closed, vertical, pressed together position to an opened flat position. The container opens and is held like a book and is referred to as a book-type seedling container. Each wall member has spaced apart, inwardly projecting elongate shoulders joined by connecting webs. Mutually opposed pairs of shoulders come together in the closed position to complete, in conjunction with the webs, the formation of vertical, elongated, open-topped cells or cavities. At their lower or base end, the webs and shoulders forming a cell define a bottom opening. This opening functions to air-prune the downwardly projecting roots of a seedling being raised in growing medium filling the cavity.

Each pair of opposed shoulders is formed to provide a shiplap joint. This is done to reinforce the container against lengthwise slippage of one wall member relative to the other. If such slippage takes place then the effectiveness of the seal, provided by the shoulders forming the two side walls of the cell, is lost. Once the seal is lost, the roots from one cell will penetrate through the breached seal into the next cell. This creates serious difficulties as the root systems of the separate seedlings are now entwined.

The known shiplap joint is illustrated in FIGS. 10 and 12 of Canadian Patent 1,068,482. It involves providing shoulders on one wall member which are formed by low and high ledges extending in parallel adjacent relationship. The ledges are of about equal width. Close to the outer end of the shoulder, there is a "crossover"—that is the low and high ledges exchange positions for the balance of the length of the shoulder. As a result of its stepped configuration, the shoulder forms a long recess extending along one side of the shoulder and then, at the crossover point, a short recess extending the balance of the length of the shoulder along its other side. The opposing shoulder on the other wall member is formed in the same manner except that the long and short recesses are formed along sides opposite to those of the first shoulder, when the two shoulders are pressed together, the high ledges of the shoulders seat in the recesses of the opposite shoulder, to form a solid wall between cells. This solid wall has a part-line, but that part-line is tortuous in configuration and resists root penetration. The "crossover" structure of the two shoulders functions to resist longitudinal displacement of the container walls.

This shiplap joint has long worked reasonably effectively for its purpose. There was a weak spot, at the crossover, where root penetration would occasionally take place. But the crossover surfaces could be formed precisely enough with the stiff plastic sheet heretofore used, to preclude most root penetration.

However, the weakness at the crossover has been found to be more severe when more flexible plastic sheet (such as that obtained from recycled plastic) is used to fabricate the container. There is therefore a need to improve the seal.

SUMMARY OF THE INVENTION

In accordance with the invention, a book-type container is provided with an improved sealing assembly by combining:

interlocking low and high ledges extending continuously, without crossover, substantially the entire width of the two wall members; with centrally positioned, opposed socket and prong means at the outer ends of each opposed pair of shoulders, said socket and prong means having a frictional fit but being manually disengageable;

whereby the weak spot at the shiplap changeover is eliminated, while preserving the desired resistance to wall longitudinal slippage by pinning the wall members together with the socket and prong means.

Broadly stated, the invention is a book-type container for growing seedlings comprising: a pair of opposed first and second wall members, each formed of flexible, substantially nonporous sheet plastic material, each wall member being formed by a series of spaced, inwardly projecting elongate shoulders integrally joined by webs, the shoulders of the first wall member being mutually opposed relative to the shoulders of the second wall member, said mutually opposed shoulders being adapted to engage when the wall members are pressed together to combine with the webs to form a series of open-topped cells, said wall members being joined at the bases of each pair of opposed shoulders by hinge means, each opposed pair of webs combining with the adjacent shoulders to form an air-pruning opening at the base of the cell; each pair of opposed shoulders comprising first and second shoulders forming part of the first and second wall members respectively; each first shoulder having parallel, adjacent, longitudinally extending low and high ledges, said ledges being about equal in width and extending continuously substantially the full extent of the first wall member, whereby the ledges combine to form an elongate recess along one side of the first shoulder, said first shoulder having means at its outer end forming an open socket that is substantially centrally positioned relative to the first shoulder axis; each second shoulder having low and high ledges substantially the same in form as those of the first shoulder except that the positioning of the low and high ledges is reversed, whereby the high ledge of the first shoulder may seat in the recess of the second shoulder and vice versa when the container is closed and the wall members are pressed together, said second shoulder having means at its outer end forming a prong that is substantially centrally positioned relative to the second shoulder axis and is configured to have a frictional fit with the socket of the first shoulder; whereby the ledges of the first and second shoulders may interlock in continuous fashion without crossover along substantially the entire extent of the shoulders in the closed position and the disengageable prong and socket means pin the shoulders together at their outer ends in the closed position.

DESCRIPTION OF THE PREFERRED EMBODIMENT

Figure 1:
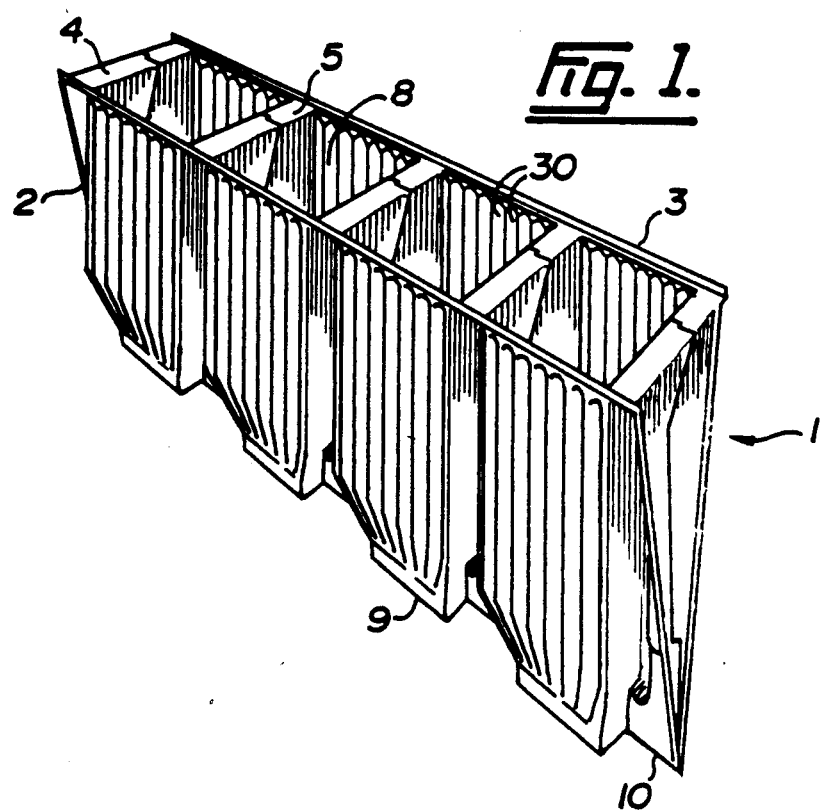
FIG. 1 is a perspective view showing the book-type container in the closed position.
Figure 2:
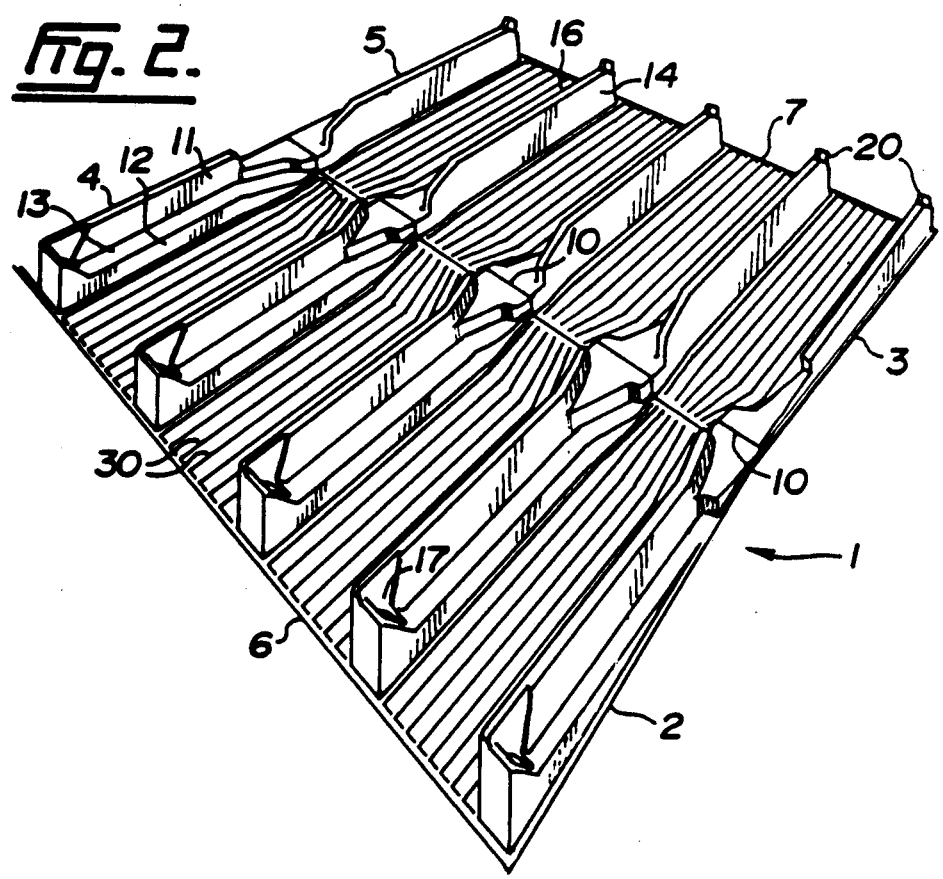
FIG. 2 is a perspective view showing the container in the open position.
Figure 3:
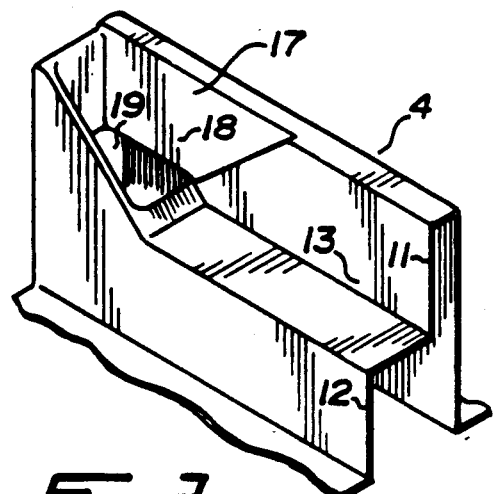
FIG. 3 is a perspective view showing the socket.
Figure 4:
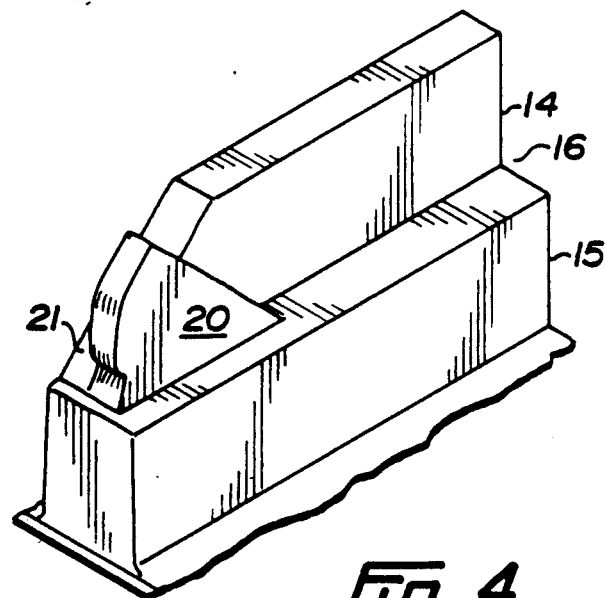
FIG. 4 is a perspective view showing the prong.
Figure 5:
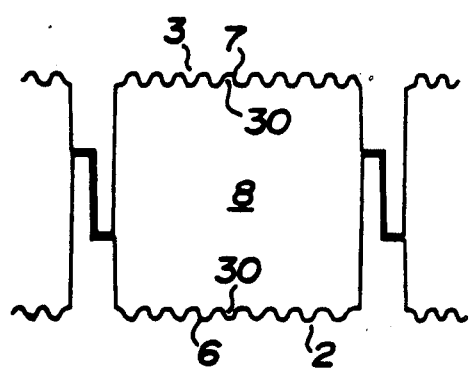
FIG. 5 is a top view of part of the container taken along the line A—A of FIG. 1.

The container 1 comprises opposed first and second wall members 2,3. The wall members are formed of thin, flexible, nonporous plastic sheet, such as 0.010 inch thick high impact polystyrene.

The wall members 2,3 are formed by spaced apart, inwardly projecting shoulders 4,5 integrally joined by webs 6,7. The webs 6,7 are corrugated, to provide root-guidance grooves 30 to cause the roots to develop in a straight, downwardly directed form. The first shoulders 4 of the first wall member 2 are mutually opposed to and aligned with the second shoulders 5 of the second wall member 3. Thus each pair of opposed shoulders 4,5 meet when the wall members 2,3 are in the closed position.

When the wall members 2,3 are in the closed position, the shoulders 4,5 and Webs 6,7 combine to form a series of isolated cells 8 having air-pruning openings 9 at their lower ends.

The wall members 2,3 are hinged together at their lower ends by thin flexible strips 10 of plastic. The strips 10 are integral with and join the shoulders 4,5.

Turning now to the specific structure of the first shoulders 4, each is formed to provide parallel, adjacent, continuous high and low ledges 11, 12 which are of substantially equal width. The ledges 11, 12 extend substantially the full width of the wall member 2. The stepped arrangement of the ledges 11, 12 results in the formation of an elongate recess 13 extending along one side of the first shoulder 4.

The second shoulders 5 have substantially the same configuration as the first shoulders 4, except as provided below. More particularly, each second shoulder 5 has parallel, adjacent, continuous high and low ledges 14, 15 which are of substantially equal width (and equal in width to the ledges 11, 12). The ledges 14, 15 also extend substantially the full extent of the wall member 3. The ledges 14, 15 define an elongate recess 16. However, the relative location of the second wall member ledges 14, 15 is switched relative to that of the ledges 11, 12 of the first wall member 2. Stated otherwise, the recess 16 extends along the opposite side of the second shoulder 5, relative to the recess 13 of the first shoulder 4.

At its outer end, each first shoulder 14 forms a socket 17 having a triangularly-shaped cavity 18 with a small opening 19 in its rear wall. Each second shoulder 5 forms an inwardly projecting, triangularly-shaped prong 20. The socket cavity 18 and prong 20 are sized to have an interference fit. The prong 20 is formed with a detent 21. When the prong 20 enters the cavity 18 it extends through the back opening 19 and the prong detent 21 snap latches with the edge of the opening 19. In summary, the prong and socket are designed to separate manually without difficulty, but they have a frictional and snap interlock that resists separation sufficiently to hold the shoulders 4,5 pinned together tightly when the container 1 is subjected to the movements and stresses of normal use.

The scope of the invention is defined by the claims now following.

THE EMBODIMENTS OF THE INVENTION IN WHICH AN EXCLUSIVE PROPERTY OR PRIVILEGE IS CLAIMED ARE DEFINED AS FOLLOWS:

1. A book-type container for growing seedlings comprising:

a pair of opposed first and second wall members, each formed of flexible, substantially non-porous sheet plastic material, each wall member being formed by a series of spaced, inwardly projecting elongate shoulders integrally joined by webs, each of said shoulders having a base, the shoulders of the first wall member being mutually opposed relative to the shoulders of the second wall member, said mutually opposed shoulders being adapted to engage when the wall members are pressed together to combine with the webs to form a series of open-topped cells, said wall members being joined at said bases of each pair of opposed shoulders by hinge means, each opposed pair of webs combining With the adjacent shoulders to form an air-pruning opening at the base of the cell;

each pair of opposed shoulders comprising first and second shoulders forming part of the first and second wall members respectively;

each first shoulder having parallel, adjacent, longitudinally extending low and high ledges, said ledges being about equal in width and extending continuously substantially the full extent of the first wall member, whereby the ledges combine to form an elongate recess along one side of the first shoulder, said first shoulder having an inner and outer end and means at its outer end forming an open socket that is substantially centrally positioned relative to the first shoulder axis;

each second shoulder having low and high ledges substantially the same in form as those of the first shoulder except that the positioning of the low and high ledges is reversed, whereby the high ledge of the first shoulder may seat in the recess of the second shoulder and vice versa when the container is closed and the wall members are pressed together, said second shoulder having an inner and outer end and means at its outer end forming a prong that is substantially centrally positioned relative to the second shoulder axis and is configured to have a fractional fit with the socket of the first shoulder;

whereby the ledges of the first and second shoulders may interlock in continuous fashion without crossover along substantially the entire extent of the shoulders in the closed position and the disengageable prong and socket means pin the shoulders together at their outer ends in the closed position.

2. The container as set forth in claim 1 wherein:

the socket has an opening in its rear wall; and the prong has a detent, said prong being adapted to extend sufficiently through the socket opening whereby the detent snap locks with the socket wall edge of the opening.

* * * * *